United States Patent [19]

Fisher

[11] Patent Number: 5,776,612
[45] Date of Patent: Jul. 7, 1998

[54] WINDOW THAT TRANSMITS LIGHT ENERGY AND SELECTIVELY ABSORBS MICROWAVE ENERGY

[75] Inventor: Donald S. Fisher, Valley Center, Calif.

[73] Assignee: Exotic Materials Inc., Murrieta, Calif.

[21] Appl. No.: 604,170

[22] Filed: Feb. 21, 1996

[51] Int. Cl.$^6$ ............................... G02B 5/28; G02B 1/10; B32B 7/00
[52] U.S. Cl. .......................... 428/426; 428/432; 359/359; 359/585; 359/589
[58] Field of Search ................................... 428/426, 432, 428/698; 359/359, 589, 585

[56] References Cited

U.S. PATENT DOCUMENTS

| | | | |
|---|---|---|---|
| 4,778,731 | 10/1988 | Kraats et al. | 428/623 |
| 4,939,043 | 7/1990 | Biricik et al. | 428/336 X |
| 5,073,451 | 12/1991 | Iida et al. | 428/432 X |
| 5,091,244 | 2/1992 | Biornard | 359/359 X |
| 5,119,232 | 6/1992 | Daley et al. | |
| 5,147,694 | 9/1992 | Clarke | 428/432 X |
| 5,358,787 | 10/1994 | Fontana et al. | 359/359 X |

OTHER PUBLICATIONS

H.A. Macleod, "Thin-Film Optical Filters" McMillan Publishing Co., pp. 32-37 (1986).

Philip E. Ciddor et al., Equivalent thin film of a periodic metal grid, *Appl. Optics*, vol. 28, No. 6 (15 Mar. 1989), pp. 1228-1230.

*Primary Examiner*—Daniel Zirker
*Attorney, Agent, or Firm*—Gregory Garmong

[57] ABSTRACT

A window includes a first layer of a dielectric first material that transmits radiation in the visible or the infrared, and a second layer positioned adjacent to the first layer. The window is positioned so that the radiation is incident upon the first layer. The second layer is formed of a dielectric or semiconductor second material that transmits radiation in the same wavelength range as the first material. A first electrical conductor lies between the first layer and the second layer. A second electrical conductor lies on at least one of an exterior surface of the first layer remote from the second layer and an interior surface of the second layer remote from the first layer. Where the first and second materials are selected to transmit in the infrared, the first and second electrical conductors are grids. Where the first and second materials are selected to transmit light in the visible, the first and second electrical conductors are continuous layers.

29 Claims, 12 Drawing Sheets

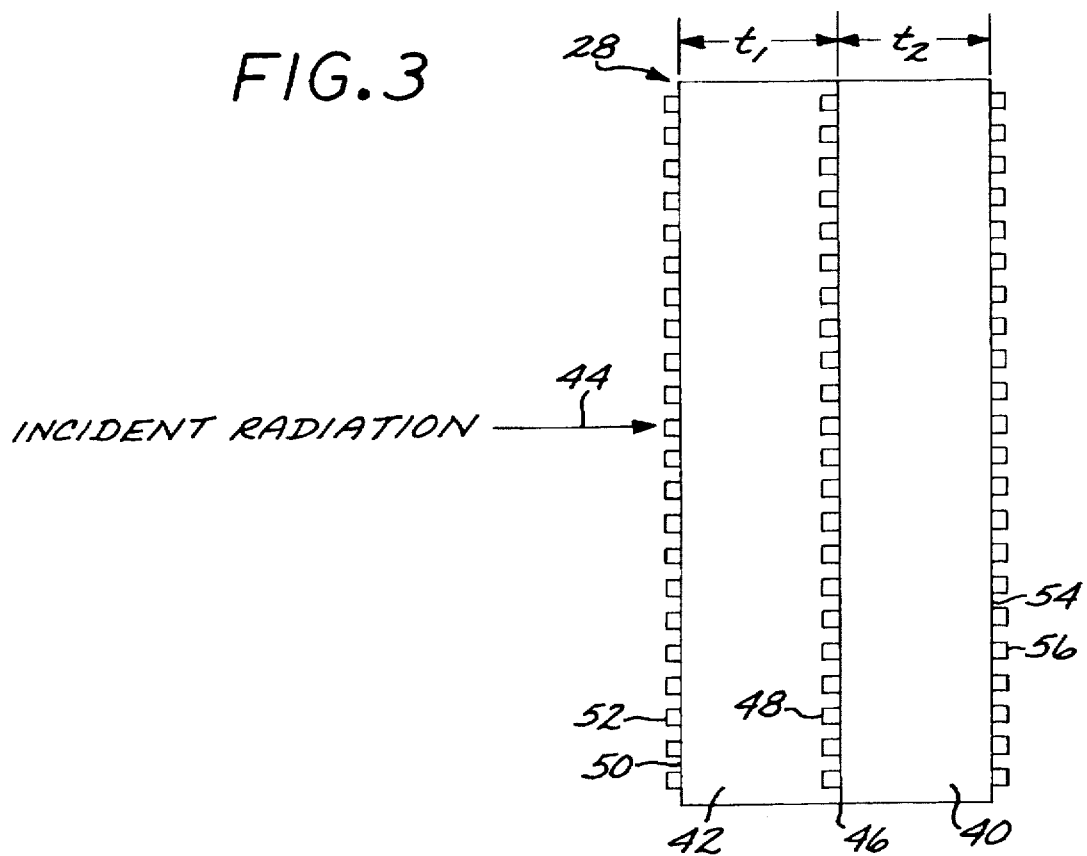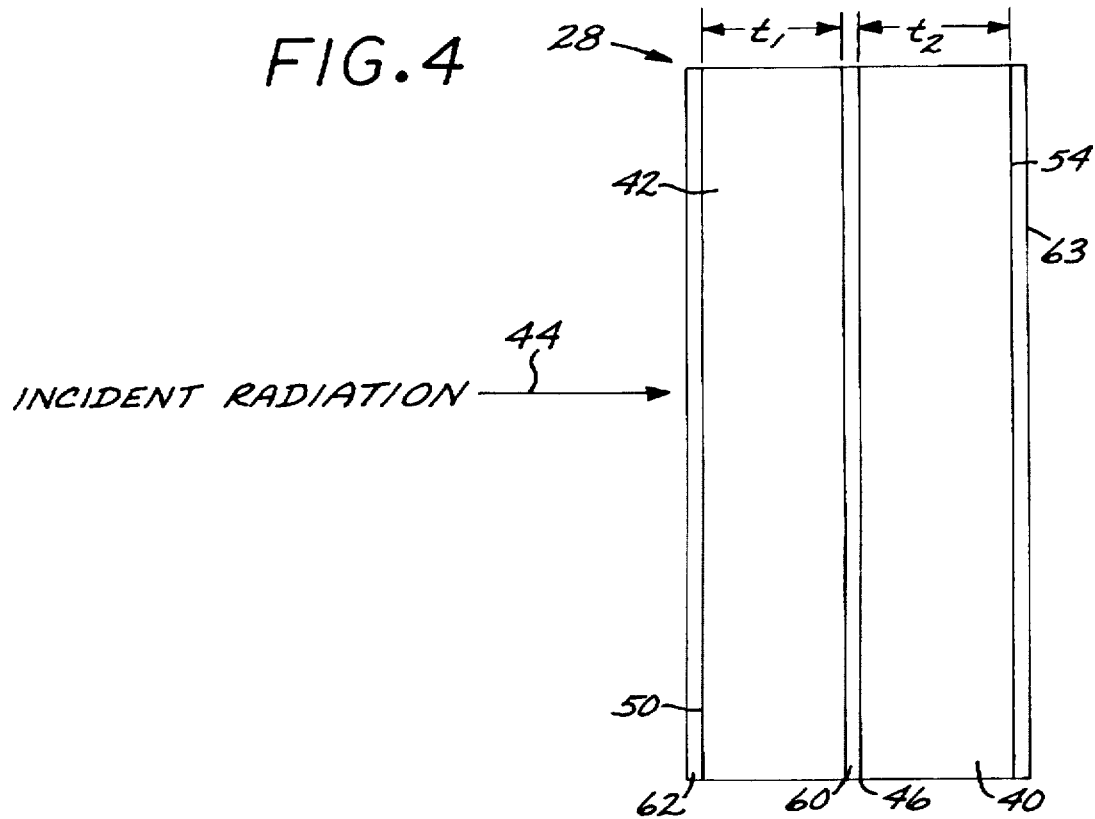

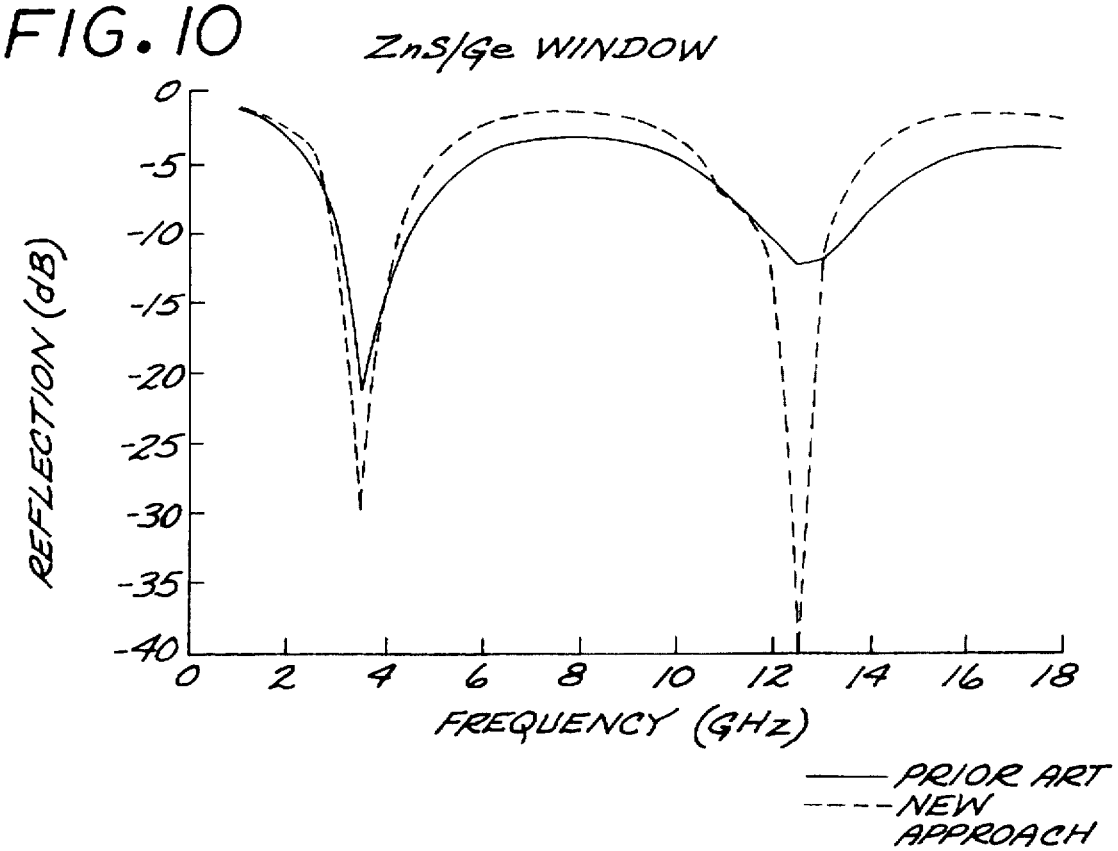
FIG. 10 ZnS/Ge WINDOW
—— PRIOR ART
---- NEW APPROACH
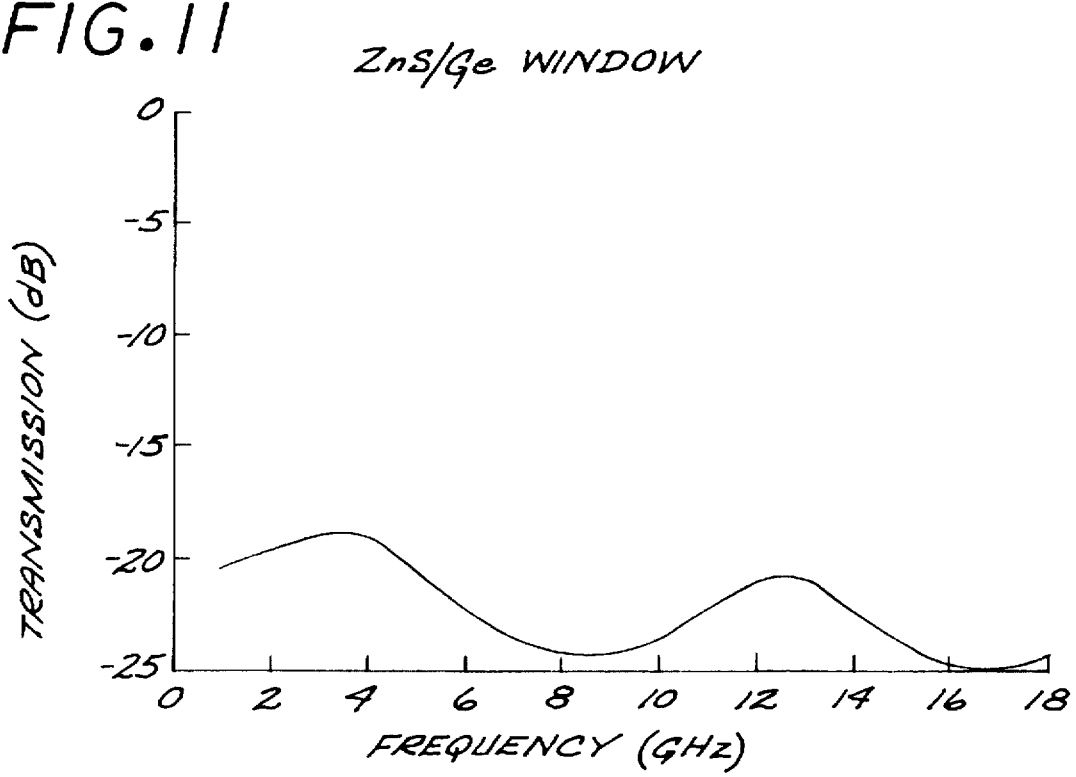
FIG. 11 ZnS/Ge WINDOW FIG. 12  ZnSe/ZnSe WINDOW
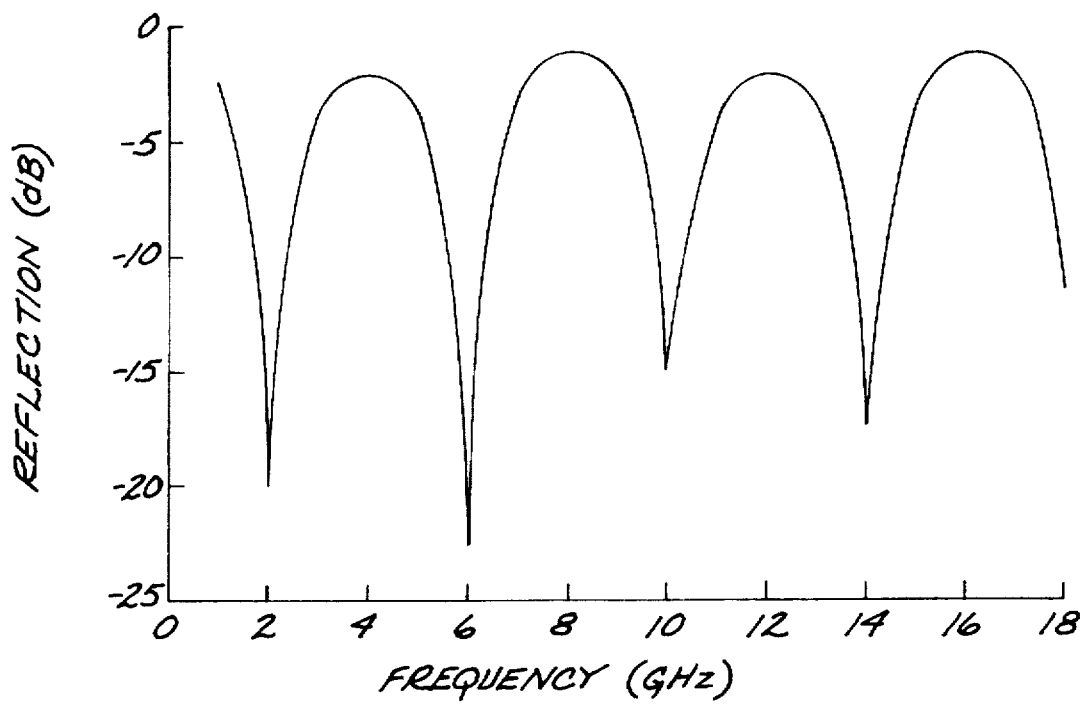
FIG. 13  ZnSe/ZnSe WINDOW
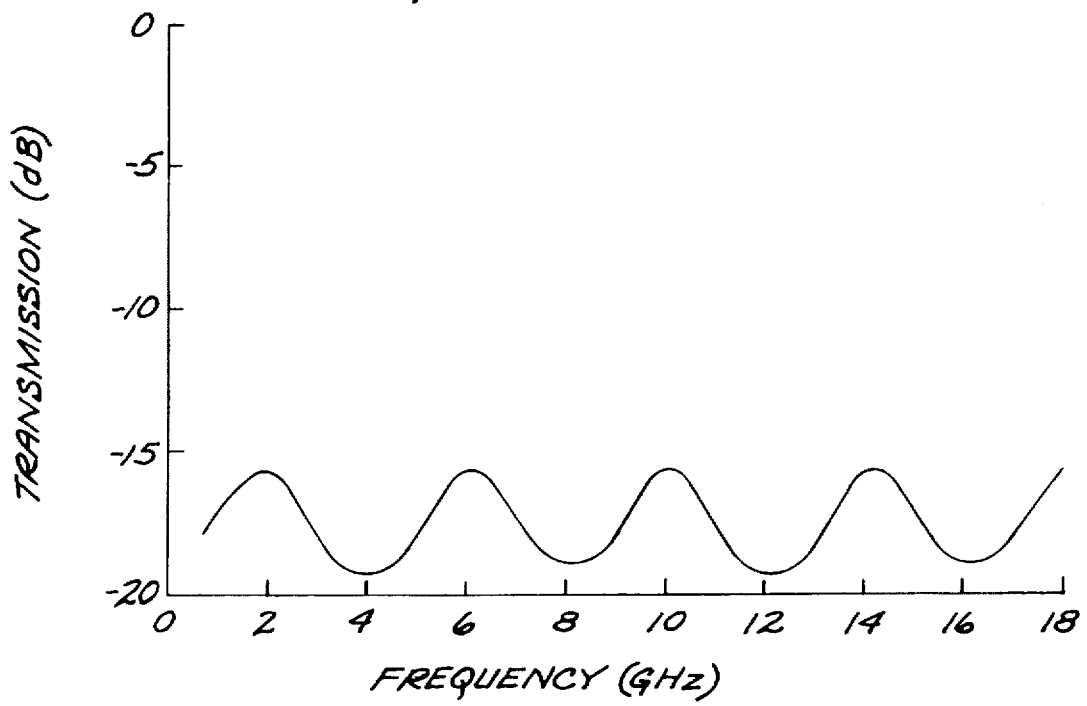

FIG. 14  ZnSe/ZnSe WINDOW
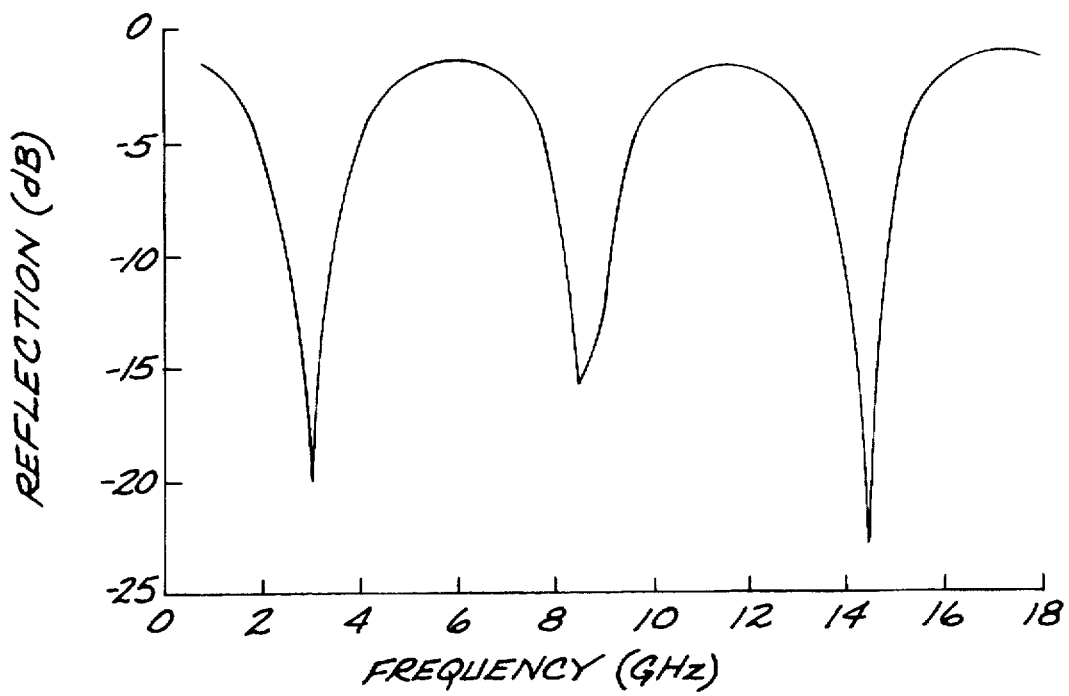
FIG. 15  DIAMOND/ZnSe
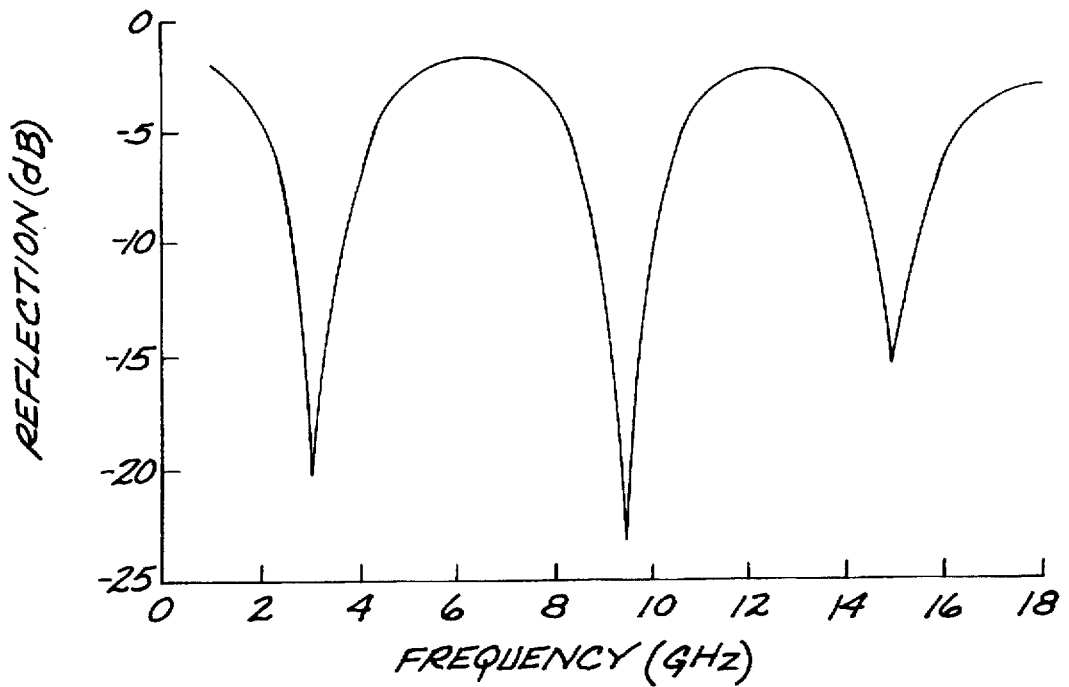

BK7/BK7 WINDOW

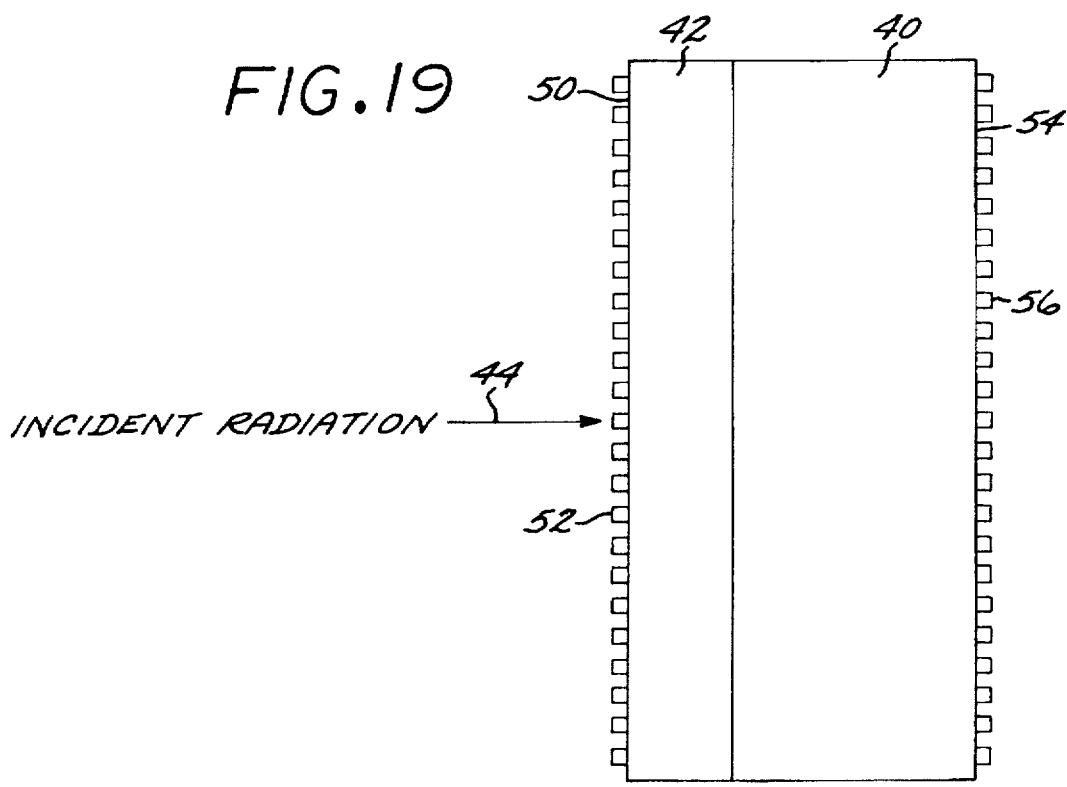
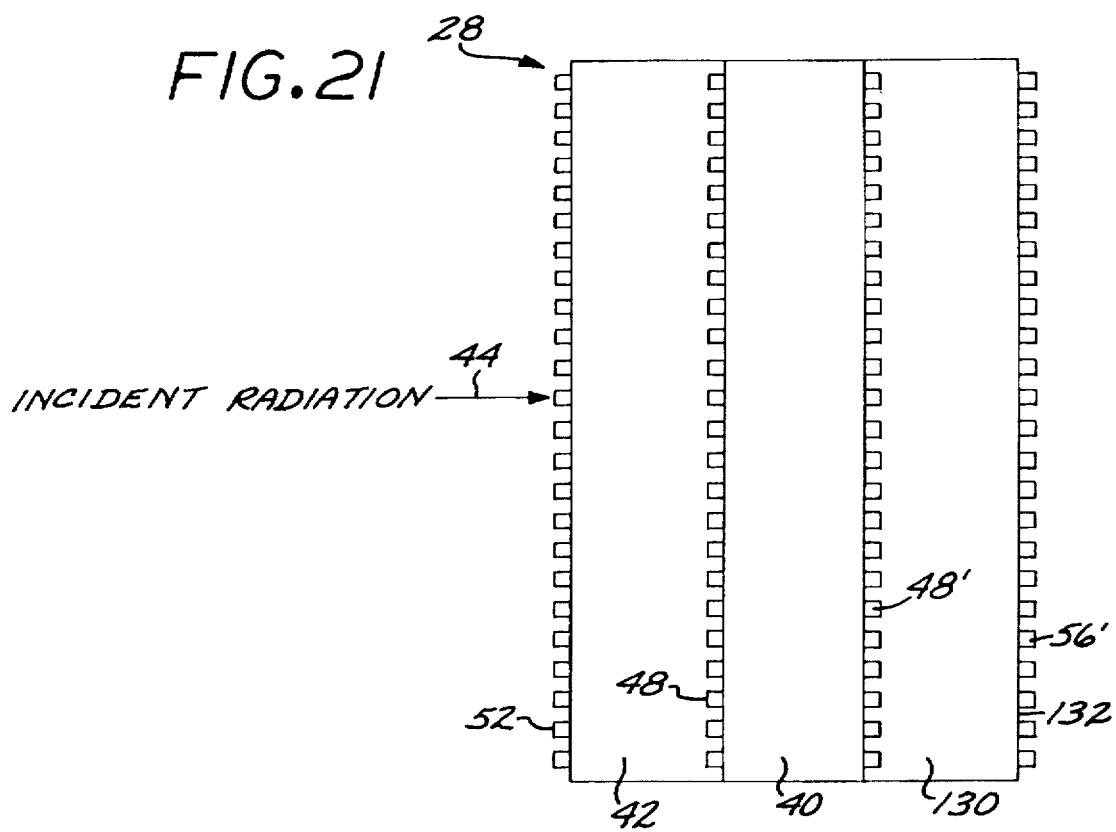

WINDOW THAT TRANSMITS LIGHT ENERGY AND SELECTIVELY ABSORBS MICROWAVE ENERGY

BACKGROUND OF THE INVENTION

This invention relates to a window that transmits light, either in the visible or the infrared ranges, but that selectively absorbs microwave energy.

In service, a sensor is often placed behind a window that protects the sensor from a variety of external effects but allows the transmission of the energy which is to be sensed. As an example, a visible-light sensor or an infrared sensor may be positioned in an aircraft in a forwardly facing orientation. A window that is transparent to the energy range being sensed is placed over the sensor to protect the sensor against aerodynamic loadings and particulates.

Additionally, the window desirably prevents energy of other wavelengths, such as microwave energy used by radar, from reaching the sensor and from being reflected back to the source from the window and sensor. Such energy reaching the sensor could cause spurious readings in the sensor, even though the primary sensitivity of the instrument is to light energy. Energy of other wavelengths, such as microwave energy, in sufficiently high intensities could also be used to blind the sensor by overloading or physically disrupting it. If the microwave energy is reflected from the window or the sensor, it can be used to advantage by an adversary in a military application to overcome low-observables technology utilized in other parts of the vehicle.

A number of structures have been utilized to provide a window that is transmissive to light but not to microwave energy. Such techniques include, for example, the use of absorption dyes, diffraction structures, and quarterwave stacks. In one approach, described in U.S. Pat. No. 5,119,232, a two-layer infrared-transmissive window based upon the quarter-wave cancellation principle includes a first layer transmissive to infrared energy and absorptive of microwave energy, and a second layer transmissive to infrared energy and which has a low reflectivity for the microwave energy. The second layer has a thickness of one-quarter of the wavelength of the microwave radiation in the material of the second layer. Data provided in FIG. 2 of the '232 patent shows that relative reflectivity may be reduced by a maximum of about −8 db in particular microwave bands that can be selected to correspond to the expected frequencies of incident microwave energy.

The available approaches, while operable to varying degrees, could be improved in attenuation effectiveness, selectability of microwave frequency bands, that can be cancelled, materials, and cost. The present invention achieves these improvements, and provides other advantages as well.

SUMMARY OF THE INVENTION

The present invention provides a window that is transmissive to light in the form of visible or infrared energy, has low transmissivity to microwave energy in the wavelength ranges of interest, and provides microwave attenuation in reflection in selectable wavelength ranges. The window transmits light with little energy loss, but strongly attenuates microwave energy in the wavelengths for which it is tuned. Stronger attenuations are attained than with other approaches. A wide variety of materials may be used, leading to less-expensive but highly effective windows tailored to specific applications. For example, for some applications the window may be made of dielectric, non-semiconductor materials, and the window materials may be selected to minimize thermal stresses within the window. The approach of the invention also permits the use of other desirable structural components in conjunction with the window, such as highly durable exterior coatings, antireflective coatings, and internal electrodes for heating and/or grounding.

In accordance with the invention, a window comprises a first layer of a dielectric first material that transmits radiation in a transmitted wavelength range, either the visible or the infrared. A second layer is positioned adjacent to the first layer. The second layer is a second material that transmits radiation in the transmitted wavelength range selected for the first material, and is either a dielectric or a semiconductor. A first electrical conductor means is disposed between the first layer and the second layer, to imparting electrical conductivity to a region between the first layer and the second layer. A second electrical conductor means is disposed on at least one of an exterior surface of the first layer remote from the second layer and an interior surface of the second layer remote from the first layer, for imparting electrical conductivity at the exterior surface.

The nature of the two electrical conductor means depends upon the wavelength of the light energy that is to be transmitted. Where the window is designed to be transmissive to visible light, the two electrical conductor means are layers of materials that are transmissive to visible light and are electrically conductive. Where the window is designed to be transmissive to infrared energy, the two electrical conductor means could be layers of materials that are transmissive to infrared energy and are electrically conductive. However, no such materials are known at the present time, but they could be used if discovered at a later time. Instead, the two electrical conductor means are grids of electrical conductors. The first electrical conductor grid is positioned between the two layers and the second electrical conductor grid is positioned on either the exterior surface or the interior surface of the window, or both.

The construction of the window of the invention permits the selection of the bands of microwave energy to be attenuated in reflection by varying a number of parameters of the window. These parameters include the thicknesses of the layers, the materials of construction of the layers, and the electrical properties of the electrical conductor means. Studies with prototype windows have demonstrated the selectability of the microwave bands for attenuation, and attenuations in reflection within the selected bands of about −13 db to about −17 db.

A highly significant feature of the invention is that the materials of construction of the two layers may be selected from a wide range of choices, permitting great flexibility in the selectivity of the visible or infrared energy to be transmitted, and great flexibility in the selectivity of the microwave energy bands to be attenuated in reflection. Both of the layers may be dielectrics, which are relatively expensive but which can be heated to elevated temperatures without loss of function so that the window is suitable for applications subject to aerodynamic or other types of heating. If both layers are selected to be the same dielectric material, there is the additional advantage that there are substantially no differential thermal expansion stresses and strains produced within the window during heating and cooling. Such differential thermal expansion stresses and strains can distort the window and the scene viewed by a sensor behind the window. The first layer may be a dielectric and the second layer a less-expensive semiconductor. In this case, the window is preferably used for applications near ambient temperature and where the window is not significantly heated, inasmuch as the semiconductor may suffer a loss of function at elevated temperatures due to free carrier absorption.

Other features and advantages of the present invention will be apparent from the following more detailed description of the preferred embodiments, taken in conjunction with the accompanying drawings, which illustrate, by way of example, the principles of the invention. The scope of the invention is not, however, limited to these preferred embodiments.

BRIEF DESCRIPTION OF THE DRAWINGS

FIG. 3 is a sectional view of a second embodiment of a window for use in the infrared-transmissive range;

FIG. 4 is a sectional view of a window for use in the visible-light-transmissive range;

FIG. 10 is a graph of microwave reflection as a function of microwave frequency for a window of the type shown in FIG. 2;

FIG. 11 is a graph of microwave transmission as a function of microwave frequency for a window of the type shown in FIG. 2;

FIG. 12 is a graph of microwave reflection as a function of microwave frequency for a window of the type shown in FIG. 3;

FIG. 13 is a graph of microwave transmission as a function of microwave frequency for a window of the type shown in FIG. 3;

FIG. 14 is a graph of microwave reflection as a function of microwave frequency for another window of the type shown in FIG. 3;

FIG. 15 is a graph of microwave reflection as a function of microwave frequency for a window of the type shown in FIG. 7;

FIG. 19 is a sectional view of a sixth embodiment of a window for use in the infrared-transmissive range;

FIG. 21 is a sectional view of a seventh embodiment of a window for use in the infrared-transmissive range.

DETAILED DESCRIPTION OF THE INVENTION

Figure 1:
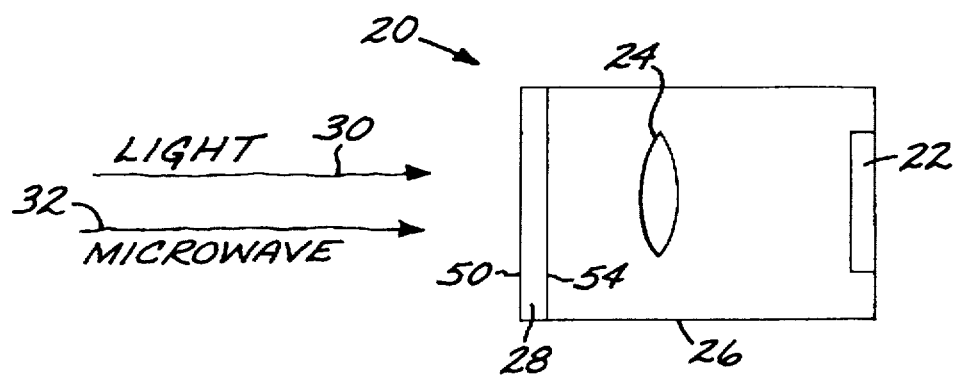
FIG. 1 is a schematic depiction of a sensor system utilizing a window.

FIG. 1 illustrates a sensor system 20 having a sensor 22 and an optical train 24 (represented schematically by an illustrated single lens) within a housing 26. A window 28 is positioned to admit light energy 30 to the housing and thence to the optical train 24 and sensor 22. Microwave energy 32 may also be incident upon the window 28. The light energy 30 and the microwave energy 32 are, collectively, the incident radiation upon the window. The window 28 is designed to admit the light energy 30 with little attenuation, but to strongly attenuate the transmission of microwave energy and to strongly attenuate the reflection of microwave energy at selected frequencies.

As used herein, "light" may be either visible light or infrared energy or radiation. Visible light has a wavelength of from about 300 to about 1500 nanometers. Infrared energy has a wavelength of from about 1500 to about 15,000 nanometers. Microwave energy has a wavelength of from about 1 to about 30 centimeters. This range encompasses commonly recognized microwave bands used for microwave radar and other applications, such as the L band at 1–2 gigahertz (GHz), the S band at 2–4 GHz, the C band at 4–8 GHz, the X band at 8–12.5 GHz, and the $K_u$ band at 12.5–18 GHz.

Figure 2:
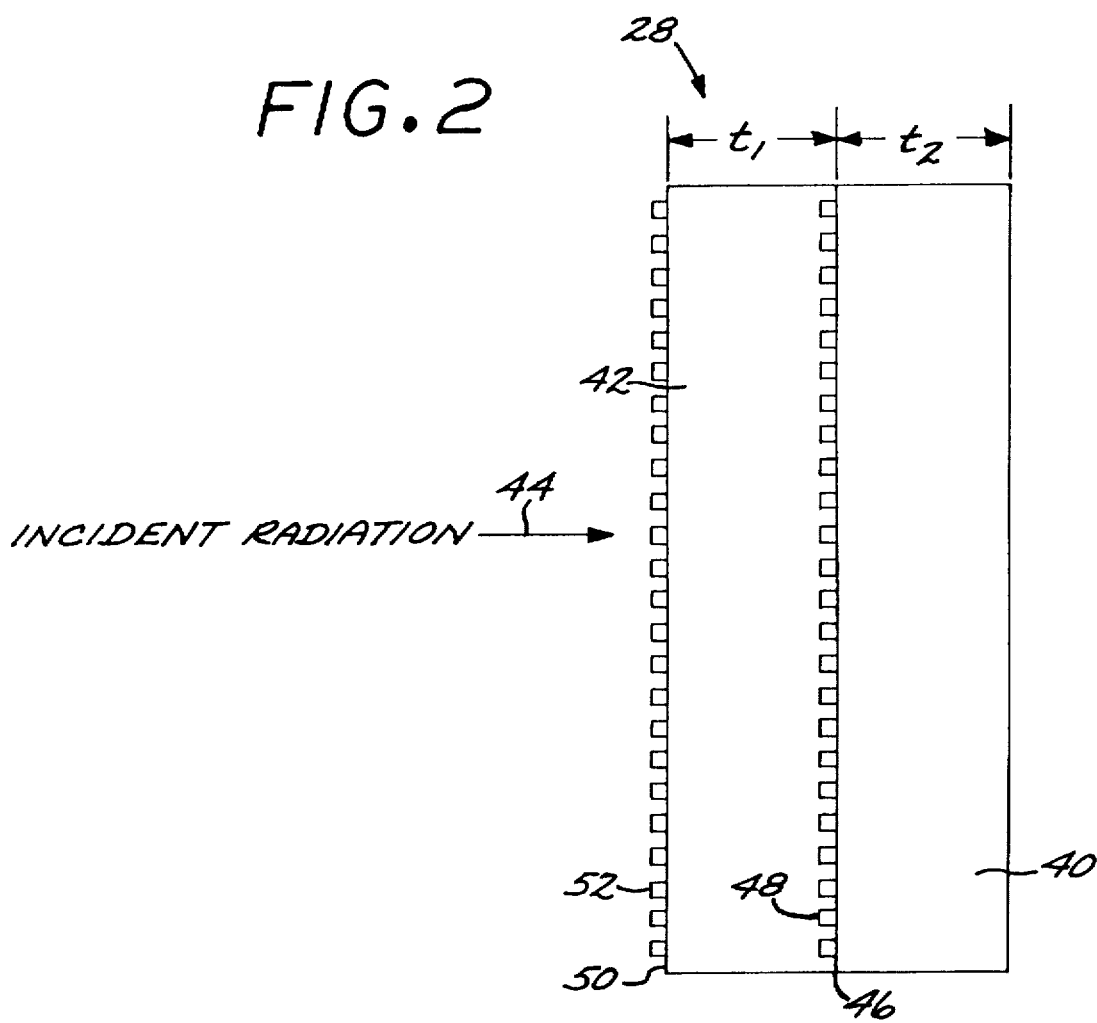
FIG. 2 is a sectional view of a first embodiment of a window for use in the infrared-transmissive range.

Fundamentally the same approaches are used in the present invention for windows 28 that are transmissive to visible light and for windows 28 that are transmissive to infrared energy. However, because of the availability of certain materials, different preferred embodiments are used. FIGS. 2–3 depict windows for transmission of infrared energy. FIG. 4 depicts a window for transmission of visible light, and FIGS. 5–7, 19, and 21 depict modifications applicable to all of the embodiments of FIGS. 2–4, but are illustrated for infrared-transmissive embodiments.

Referring to FIG. 2, the window 28 includes a first layer 42 of a dielectric first material that transmits radiation in the infrared. The first layer has a thickness $t_1$. There is, additionally, a second layer 40 of a second material that transmits energy in the infrared. The second material is either a dielectric or a semiconductor. In this embodiment, the first layer 42 intimately contacts the second layer 40 (with a conductive structure, to be discussed next, therebetween). The second layer has a thickness $t_2$. When the window is used in service, it is arranged such that incident light 30 first passes through the first layer 42 and thereafter passes through the second layer 40.

A first electrical conductor means is disposed between the first layer 42 and the second layer 40 to impart electrical conductivity in the region of an interface 46 between the first layer 42 and the second layer 40. The first electrical conductor means is preferably a first grid 48 of electrical conductors embedded between the first layer 42 and the second layer 40 at the interface 46 between these layers. In this and other embodiments utilizing grids, the grids may be of various shapes and sizes. The grid may be, for example, square and of periodic spacing, square and of randomized aperiodic spacing, polar and of periodic spacing, polar with aperiodic spacing, or circular grids with hexagonal spacing. The spacing of the grid elements is less than, and preferably much less than, the wavelength of the microwave energy that is to be reflected. For example, the grid element widths are typically from about 5 to about 15 micrometers, and the spacing of the grid elements is preferably from about 0.1 to about 2 millimeters where the microwave energy to be reflected has a wavelength of about 3 centimeters.

A second electrical conductor means is disposed on an exterior surface 50 of the first layer 42 remote from the second layer 40 and from the interface 46 between the first layer 42 and the second layer 40. The second electrical conductor means imparts electrical conductivity in the region of the exterior surface 50 of the first layer 42. The second electrical conductor means is preferably a second grid 52 of electrical conductors on the exterior surface 50 of the first layer 42.

The grids 48 and 52 are used to impart electrical conductivity at the respective locations. Equivalently, the electrical conductivity could be imparted by continuous layers of materials that are transmissive to infrared energy and are sufficiently electrically conductive. No such materials are known at the present time, however. If such materials become available in the future, they may be used in place of, and as the equivalents of, the grids 48 and 52 in the window 28 within the scope of the present invention.

In the embodiment of FIG. 2, the first layer 42 is made of a first, non-semiconductor, dielectric material that transmits energy in the infrared. Suitable materials for the first layer 42 include zinc sulfide, zinc selenide, diamond, sapphire, spinel, aluminum oxynitride, and yttrium oxide. The second layer 40 is made of a semiconductor material that transmits radiation in the infrared. Suitable materials include germanium, silicon, gallium phosphide, and gallium arsenide. In another embodiment, the second layer 40 is a non-semiconductor, dielectric material. The second grid 52 is made of a relatively high-resistivity, low-conductivity electrical conductor such as nichrome, titanium, platinum, or chromium. The first grid 48 is made of a relatively lower-resistivity, higher-conductivity electrical conductor such as gold, tungsten, aluminum, copper, silver, tungsten disilicide, or titanium disilicide.

In some other embodiments, a conductive layer is provided on the inwardly facing side of the second layer 40 to serve as a heater for the window when an electrical current is passed therethrough, and to provide sufficient electrical conductivity at the surface. No such conductive layer is required on the embodiment of FIG. 2, as the semiconductor material of the first layer is sufficiently electrically conductive, from about 1 to about 50 ohm-cm, to pass a current and act as a heater.

FIG. 3 depicts another embodiment of the window 28 for transmitting infrared energy. Those elements common with the embodiment of FIG. 2 are assigned the same numerical identifiers, and their description is incorporated. The approach of FIG. 3 differs from that of FIG. 2 in that the second layer 40 is made of a dielectric material such as zinc sulfide or zinc selenide (or others of the dielectric materials discussed previously). The first layer 42 is made of a dielectric material such as zinc sulfide (or others of the dielectric materials discussed previously). Additionally, on an interior surface 54 of the second layer 40, remote from the interface 46 and remote from the first layer 42, an electrical conductor means is deposited. The electrical conductor means at the interior surface 54 is preferably a third grid 56 of electrical conductors on the interior surface 54 of the second layer 40. The third grid 56 is made of the same types of materials as the grid 48.

FIG. 4 depicts an embodiment of the window 28 for transmitting visible-light energy. Those elements common with the embodiment of FIG. 2 are assigned the same numerical identifiers, and their description is incorporated. In the approach of FIG. 4 for transmitting visible light, the first layer 42 is made of a visible-light transmissive material such as glass, most preferably BK7 borosilicate crown-type glass, or fused silica. Other materials such as sapphire, aluminum oxynitride, zinc selenide, zinc sulfide, diamond, or spinel can also be used. The second layer 40 is made of a visible-light transmissive material such as visibly transparent zinc sulfide, sometimes termed multispectral zinc sulfide or Cleartran, zinc selenide, or glass such as BK7 glass. The first electrical conductor means is a first conductor layer 60 positioned at the interface 46 between the first layer 42 and the second layer 40, and the second electrical conductor means is a second conductor layer 62 positioned on the exterior surface 50 of the first layer 42. The conductor layers 60 and 62 are made of known materials that are visible-light transmissive and also sufficiently electrically conductive, such as indium tin oxide (ITO) made of indium oxide with up to about 10 weight percent tin. The conductive layers 60 and 62 are each preferably from about 500 to about 5000 Angstroms thick. A continuous third conductive layer 63, preferably made of ITO from about 500 to about 2500 Angstroms thick, overlies the interior surface 54 of the second layer 40.

When the first layer 42 is made of a material that is transparent to both visible radiation and to infrared radiation, such as sapphire, aluminum oxynitride, diamond, or spinel, and the second layer 40 is made of a material that is transparent to both visible radiation and to infrared radiation, such as multispectral zinc sulfide, the resulting window is transparent to both visible and infrared radiation. In that case, the various electrical conductor means would be selected as the grids discussed earlier and illustrated for the embodiments of FIGS. 2 and 3.

The electrically conductive layers and grids used in the present invention are selected to have electrical resistivities operable to accomplish their particular functions. The second grid 52 or second conductor layer 62 has a resistivity of from about 377 to about 1500 ohms per square. The resistivity must be at least about that of the impedance of air (377 ohms) to avoid an impedance mismatch with the incident radiation. The resistivity should not be more than about 1500 ohms per square in order to achieve the proper reflectance from the outwardly facing surface 50. The third grid 56 or third layer 63 has a resistivity of from about 10 to about 100 ohms per square. The third grid or third layer, where present, serves a dual purpose as a resistive heating element and a part of the microwave reflection structure. If the resistivity is less than about 10 ohms per square, window heating requirements are adversely affected because the current through the grid is too high. If the resistivity is more than about 100 ohms per square, RF transmission is increased undesirably. The embedded first grid 48 or first conductor layer 60 has a resistivity of from about 40 to about 1500 ohms per square, generally intermediate and overlapping the resistivities of the second grid or second conductive layer, and the third grid or third conductive layer. If the resistivity is less than about 40 ohms per square, RF reflection is increased across the entire microwave band and cancellations are no longer effected. If the resistivity is more than about 1500 ohms per square, the microwave energy incident upon the grid 48 or layer 60 has a tendency to pass therethrough.

The light-transmissive and microwave-absorptive/reflective properties of the window 28 are selectable through the selection of the materials of construction of the layers 42 and 40, their thicknesses $t_1$ and $t_2$, and the properties of the electrical conductors.

Figure 5:
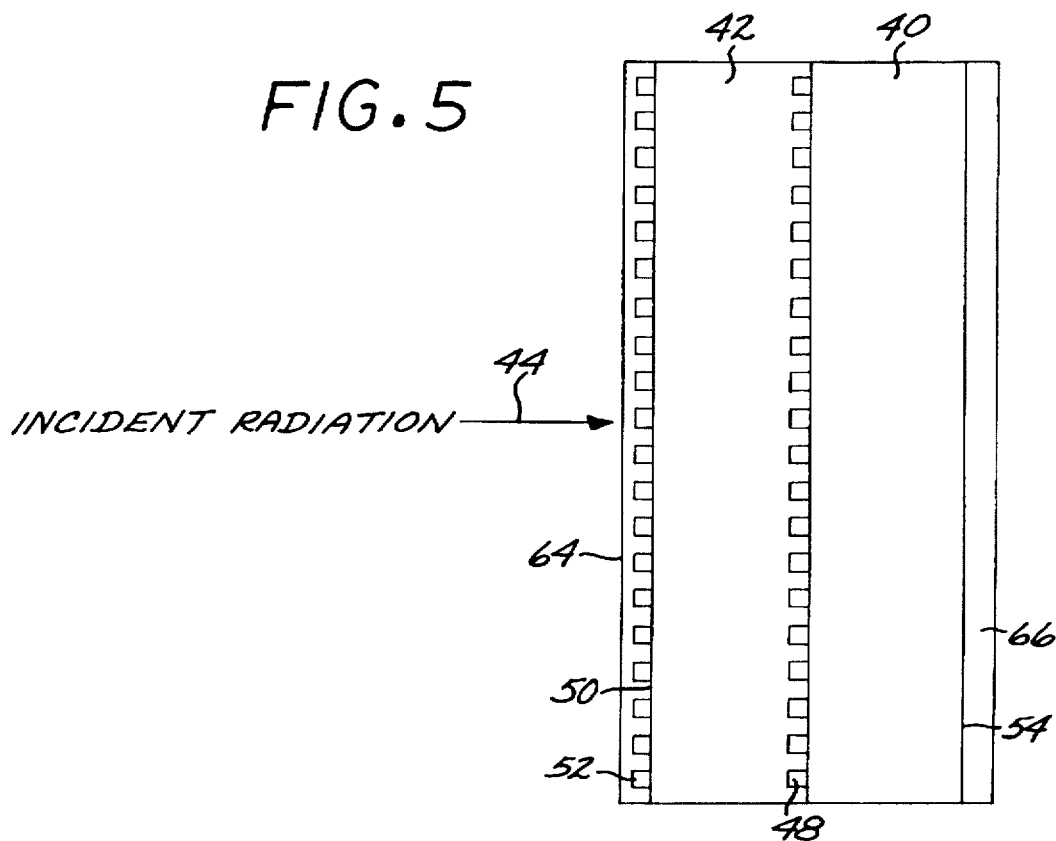
FIG. 5 is a sectional view of a third embodiment of a window for use in the infrared-transmissive range.
Figure 6:
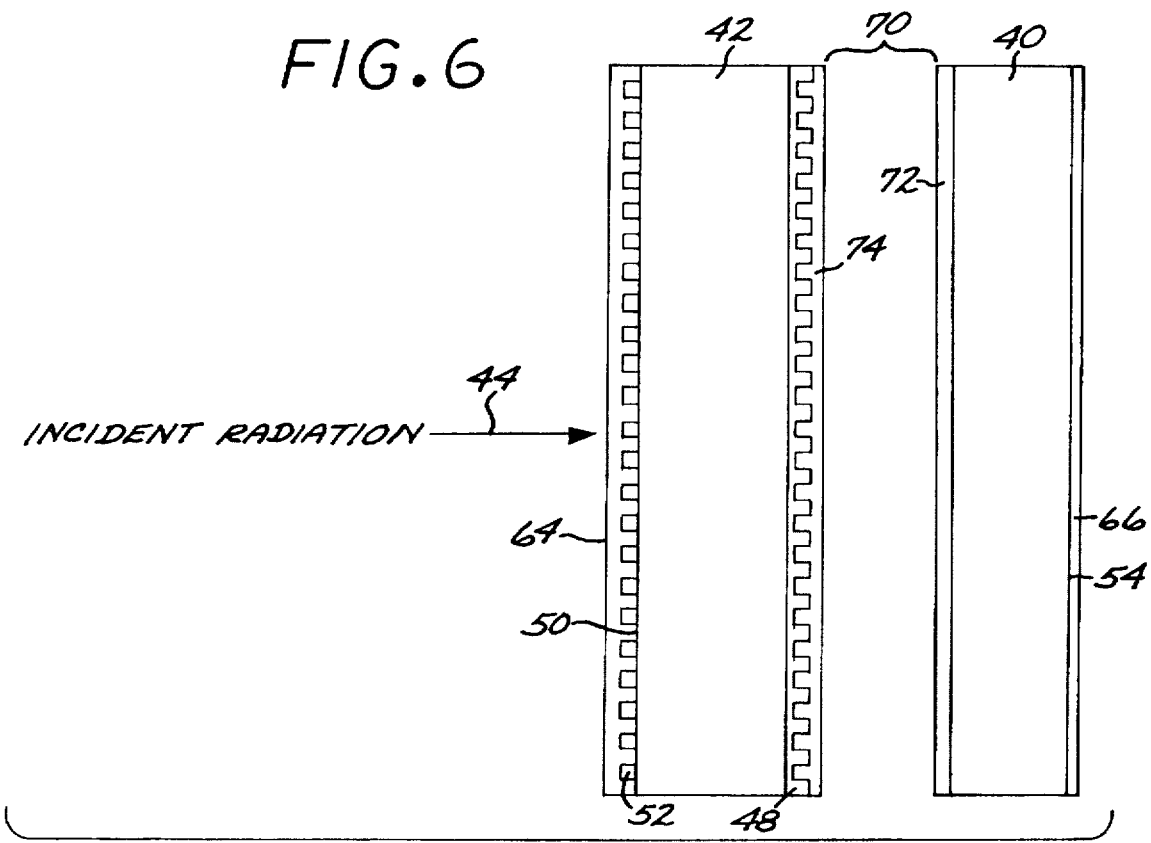
FIG. 6 is a sectional view of a fourth embodiment of a window for use in the infrared-transmissive range.
Figure 7:
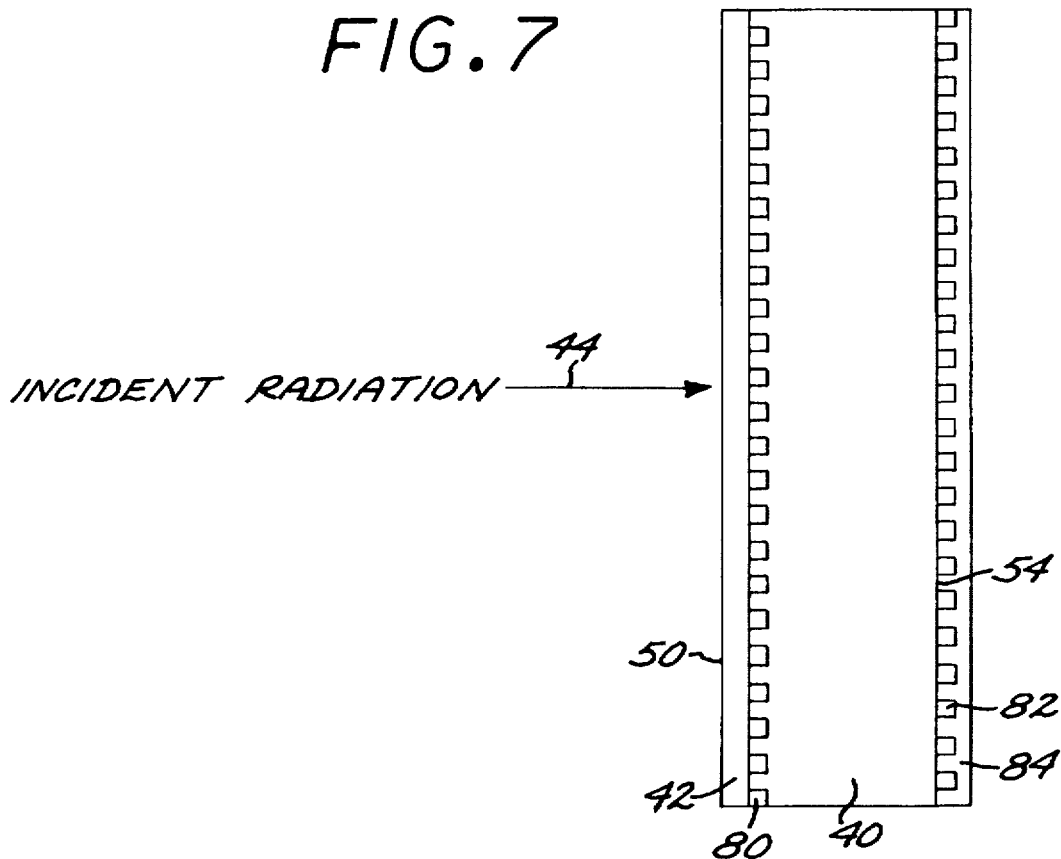
FIG. 7 is a sectional view of a fifth embodiment of a window for use in the infrared-transmissive range.

FIGS. 5–7 depict optional modifications that may be made to the basic structure of the windows shown in FIGS. 2–4. These approaches are illustrated in terms of the infrared-transmissive embodiment of FIG. 2, but the modifications are equally applicable to the visible light-transmissive embodiment as well.

Referring to FIG. 5, a protective layer 64 overlies the exterior surface 50 of the first layer 42. This protective layer 64 is transparent to the radiation to be sensed by the sensor 22, and is hard and erosion resistant to resist aerodynamic damage and heating, and also to resist impacts by particles in the air. The preferred protective layer 64 for infrared-energy transparent windows is diamond-like carbon (DLC) of a thickness of one quarter wave optical thickness with respect the infrared energy to be transmitted (Q.W.O.T.). This thickness is typically from about 0.4 to about 1.2 micrometers. The preferred protective layer for visible-light transparent windows is Q.W.O.T.-thick polycrystalline or chemical-vapor-deposited diamond.

An antireflective layer 66 optionally overlies the interior surface 54 of the second layer 40. The antireflective layer 66 is transparent to the radiation to be sensed by the sensor 22, and is resistant to reflections from the face of the sensor that would otherwise be reflected back to the sensor to cause erroneous readings. The preferred antireflective layer 66 for infrared transparent windows is a conventional Q.W.O.T.-thick multilayer dielectric coating. The preferred antireflective layer 66 for visible-light transparent windows is a single Q.W.O.T.-thick layer of magnesium fluoride or a conventional Q.W.O.T. thick multilayer dielectric coating.

The embodiment of FIG. 6 is similar to that of FIG. 5, except that the first layer 42 and the second layer 40 are separated by an air gap 70. Additional antireflective coatings 74 and 72 are added to those surfaces of the layers 42 and 40, respectively, that face the air gap. The embodiment of FIG. 6 is otherwise similar to that of FIG. 5. Corresponding elements have been assigned the same numbers, and their preceding description is incorporated here. The first layer 42 is a dielectric such as sapphire, aluminum oxynitride, zinc sulfide, zinc selenide, diamond, or spinel, and the second layer 40 is preferably a semiconductor such as germanium, silicon, gallium phosphide, or gallium arsenide. (Because the second layer is sufficiently electrically conductive, no grid is required on the interior surface 54.) This embodiment is particularly useful for windows used in aircraft that carry personnel, and must meet FAA requirements of dual-pane windows.

In the embodiment of FIG. 7, a buried conductive grid 80 is positioned between the first layer 42 and the second layer 40. The first layer 42 is preferably diamond, and the second layer 40 is preferably zinc selenide. No grid or conductive layer is required on the exterior surface 50 of the first layer 42. An interior grid 82 covered by an antireflective layer 84 on the interior surface 54 of the second layer 40 serves a dual function as a heater for the window and a participant in the microwave reflective function.

The various preferred embodiments discussed to this point have all included at least one electrically conductive grid or layer embedded between the dielectric or semiconductor layers. In another embodiment illustrated in FIG. 19, there is no embedded grid or layer between the first layer 42 and the second layer 40. The second grid 52 is positioned on the exterior surface 50, and the third grid 56 is positioned on the interior surface 54. Protective layers, antireflective coatings, and index-matching layers, as discussed previously, may also be provided.

The approach of the invention also permits the addition of more layers and more embedded grids, as shown in FIG. 21. This embodiment is illustrated in relation to the general configuration of FIG. 3, but would be applicable to other window configurations discussed herein. In the embodiment of FIG. 21, the layers 42 and 40 and the grids 52 and 48 are as in FIG. 3, whose discussion is incorporated. A further third layer 130 is added interiorly of the second layer, and a second buried grid 48' is positioned between the layers 40 and 130. The grid 56' is comparable in structure and function with the grid 56 of FIG. 3, except that it is on an interior surface 132 of the layer 130. The addition of such further layers and embedded grids permits even greater flexibility in selecting the microwave reflection attenuation performance of the window, with greater complexity and cost, and possibly greater attenuation of the light radiation transmitted through the window and to the sensor.

Figure 8:
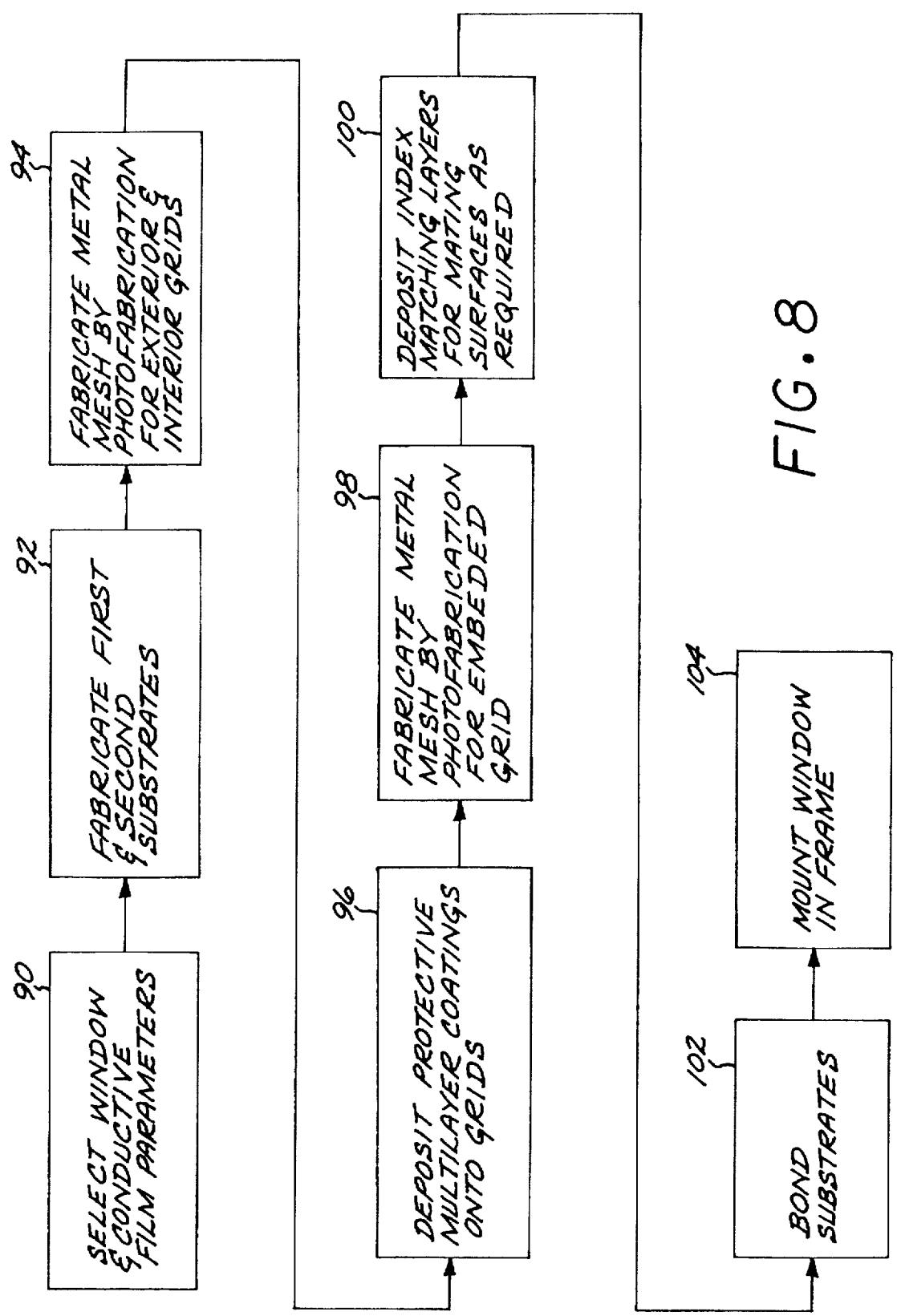
FIG. 8 is a block flow diagram for a preferred method of fabricating a window.

FIG. 8 illustrates a preferred approach for preparing a window 28 according to the present invention. The window parameters and structure are first determined and selected, numeral 90, according to the wavelength of the light to be transmitted and the wavelengths of the microwave energy to be attenuated, according to the principles discussed herein. The first and second layers are fabricated, numeral 92, by either purchase or fabrication such as crystal growth. The exterior and interior grids (e.g., grids 52 and 56 of FIG. 3) are deposited on the layers by conventional photofabrication techniques, numeral 94. In the case of continuous electrical conductor layers such as used in the embodiment of FIG. 4, the conductive layers are deposited instead of grids. The protective and antireflective coatings are deposited overlying the grids or conductive layers.

The embedded grid (e.g., grid 48 of FIG. 3) is fabricated, numeral 98. The embedded grid is preferably prepared by etching a channel, preferably using a dry etching technique such as plasma etching, having a channel depth into the surface of the second layer. The channel has the pattern required for the first grid structure. A metallic stripe is deposited into the channel, preferably by vapor deposition or a comparable technique. The stripe has a metallic stripe thickness, which is readily controlled during deposition, of less than the channel depth. Any index-matching layers for mating surfaces are deposited, numeral 100.

The layers 40 and 42, with their grids and coatings already deposited thereon, are adhesively bonded together or contacted together without an intermediate adhesive, numeral 102. After the transparent article is formed in this manner, bus connections are normally made to the metallic stripes at the periphery of either the first piece or the second piece, or their coinciding peripheries if they are of the same shape and dimension. The bus connections are connected to a voltage source or to ground, as may be required for a particular application. The periphery is sealed to prevent the intrusion of water, dirt, or chemicals into the interior of the grid structure. The attachment of the bus connections and the sealing can be done in this or the reverse order. Lastly, the assembly is mounted in a support frame, numeral 104.

Figure 9:
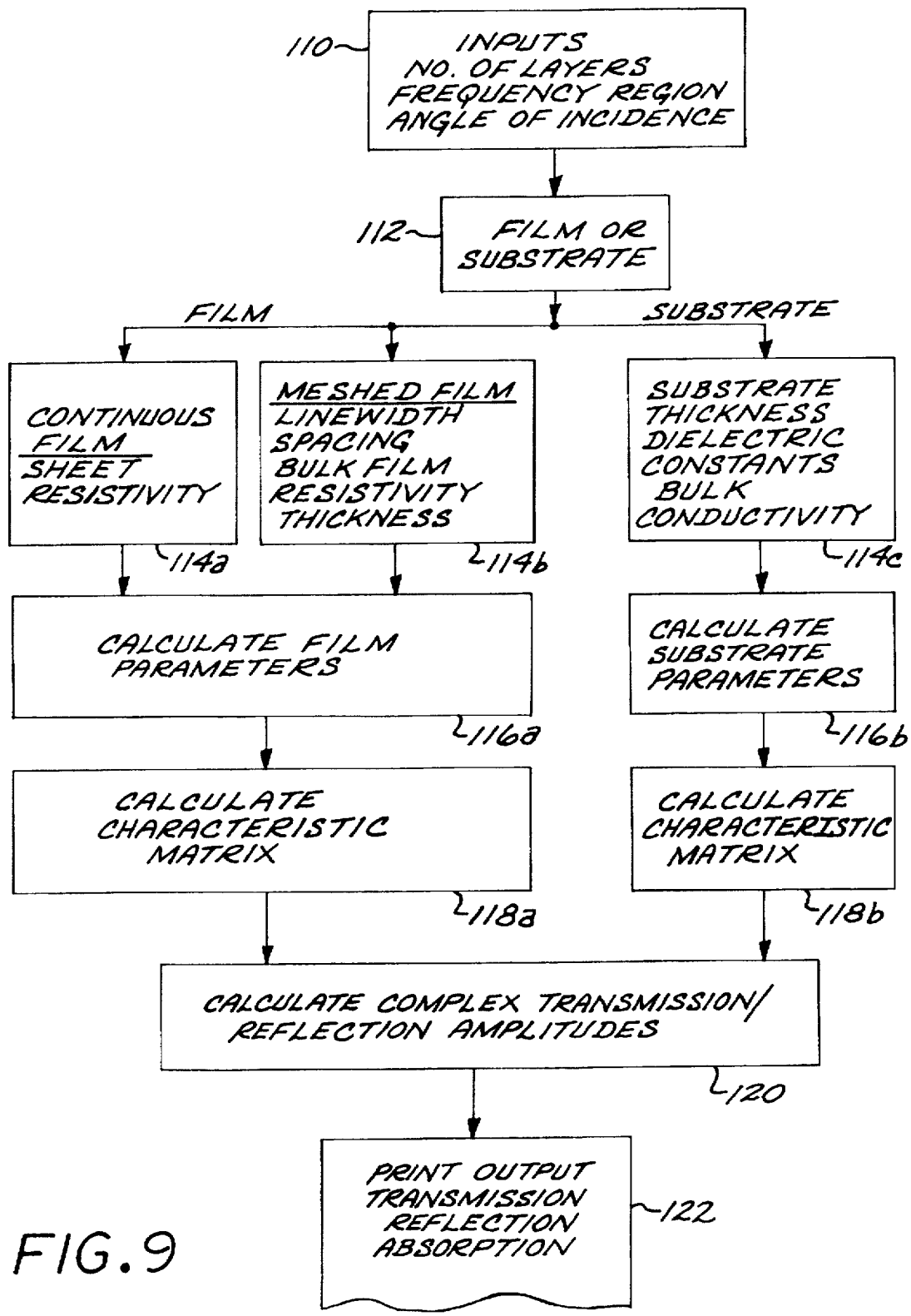
FIG. 9 is a block flow diagram for a preferred method of determining window design parameters.

FIG. 9 illustrates a preferred approach for designing and selecting the variable parameters of the window 28, although other approaches may also be used. Initial input information, including the number of layers, the frequency range of the microwave energy to be affected, and the angle of incidence (usually perpendicular), are provided, numeral 110. The type of layer to be calculated, film or substrate, is identified, numeral 112. As used herein, a film is a layer with a thickness of less than about $1/100$ of the wavelength of the microwave to be reflected, and is typically on the order of about 1 micrometer in thickness. Substrates are thicker layers or pieces. Based upon this selection, additional information is provided, numerals 114a–114c. For a continuous conductive film, the sheet resistivity is input, numeral 114a. For a mesh conductive film, the line width, thickness, and spacing of the film, and the bulk film resistivity, are provided, numeral 114b. For a substrate, the thickness, dielectric constants, and bulk conductivity are input, numeral 114c.

From these data, the film parameters, numeral 116a, or substrate parameters, numeral 116b, are determined. The film parameters, numeral 116a, are determined as follows. For a continuous sheet film, the reactance X of the film is zero, and the sheet resistance R is $\rho/t$, where $\rho$ is the bulk resistivity of the sheet material and t is the thickness of the film. For a patterned grid, the resistivity R is R=$\rho/t$ (g/2a), where g is the grid spacing and a is half the grid line width. The equivalent grid reactance X is given by X=(g/$\lambda$) ln |csc($\pi a/g$)|, where $\lambda$ is the wavelength of the radiation to be passed through the window. From these determinations, the optical admittance $\psi$ of the film (either continuous or patterned) is calculated as $\psi=1/(R+ix)$.

The comparable required parameter for a substrate, calculated at step 116b, is the complex dielectric constant $\epsilon$, which is determined as $\epsilon=\epsilon_r-i(\sigma/4\pi f\epsilon_o\epsilon_r^{1/2})$, where $\epsilon_r$ is the real part of the dielectric constant, sometimes known as the host dielectric constant and which may vary as a function of frequency, $\sigma$ is the DC conductivity, f is frequency, $\epsilon_o$ is the permittivity of free space, and $\epsilon_r$ is the real part of the dielectric constant.

The characteristic matrix M is calculated, numeral 118a for a film and numeral 118b for a substrate. For a film or grid, numeral 118a, $M_g$ is given by $$M_g = \begin{vmatrix} m_{11} & m_{12} \\ m_{21} & m_{22} \end{vmatrix} = \begin{vmatrix} 1 & 0 \\ \psi & 1 \end{vmatrix}$$

For the substrate, numeral 118b, $M_d$ is determined as $$M_d = \begin{vmatrix} m_{11} & m_{12} \\ m_{21} & m_{22} \end{vmatrix} = \begin{vmatrix} \cos\delta & i\sin\delta/\epsilon^{1/2} \\ i\epsilon^{1/2}\sin\delta & \cos\delta \end{vmatrix}$$

where $\delta=2\pi t\epsilon^{1/2}/\lambda$, and t is the thickness of the substrate.

The complex transmission $\tau$ and reflection r amplitudes of the assembly of films and substrates are calculated, numeral 120, according to the following relations $\tau=2P_1/[(m_{11}+m_{12}P_3)P_1+(m_{21}+m_{22}P_3)]$ $r=[(m_{11}+m_{12}P_3)P_1-(m_{21}+m_{22}P_3)]/[(m_{11}+m_{12}P_3)P_1+(m_{21}+m_{22}P_3)]$ $P_j=\epsilon^{1/2}\cos(\theta)$ where $P_1$ represents the properties of the incidence medium, $P_3$ represents the properties of the exit medium, and $\theta$ is the angle of propagation through the medium and for normal incidence $\theta=0$.

The results for transmission, reflection, and absorption are printed out for use in preparing the windows, numeral 122.

The following examples illustrate aspects of the invention. However, they should not be taken as limiting of the scope of the invention in any respect.

EXAMPLE 1

A window of the general configuration shown in FIG. 3 was fabricated. The grid 52 had a surface resistivity of 1000 ohms per square. The first layer 42 was zinc selenide with a thickness of 0.25 inches. The embedded grid 48 had a surface resistivity of 750 ohms per square. The second layer 40 was zinc selenide with a thickness of 0.25 inches. The grid 56 had a surface resistivity of 25 ohms per square. This window is transmissive to light ranging from the visible to the medium wavelength infrared to the long wavelength infrared. As shown in FIG. 12, five different peaks in the reflection were obtained between 1 and 18 GHz, spanning numerous ones of the commonly used microwave bands. All of these peaks had excellent attenuations of −15 dB to −22 dB. FIG. 13 illustrates the excellent attenuation in the transmission of microwave energy attained with this window, over the entire wavelength range.

Using these results, the analytical technique discussed previously was verified. The analytical technique was thereafter used to calculate the performance of various window types, as reported in the following Examples 2–7.

The present invention permits the first layer and the second layer to be made of the same material or materials of substantially the same dielectric constant, as shown in this example. The desirable transmissive and reflective properties are obtained through the presence of the conductive grids. Making the first layer and the second layer of the same material has the important advantage that there is no difference in the coefficient of thermal expansion between the two layers, and consequently substantially no resulting thermal strains and stresses when the window is heated and cooled. (There may be very minor local thermal strains and stresses because of the presence of the grid materials.) Windows of this type are particularly advantageously employed in aircraft or missile applications where there is aerodynamic heating of the window.

EXAMPLE 2

A window having the general configuration shown in FIG. 2 was analyzed. The first layer 42 was zinc sulfide having a thickness $t_2$ of 0.25 inches, a bulk conductivity of zero, and a dielectric constant of 8–9. The second layer 40 was germanium having a thickness $t_1$ of 0.25 inches, a bulk resistivity of 20 ohm-cm, and a dielectric constant of 16. The first (embedded) grid 48 had a surface resistivity of 50 ohms per square. The second grid 52 had a surface resistivity of 1250 ohms per square. No protective layers or antireflective layers were considered.

FIG. 10 depicts the calculated microwave reflection in terms of decibels of reduction from a normalized baseline, as a function of wavelength in the range 1–18 gigahertz (GHz) for the present approach, and also for a window made of the same materials and reported as curve B of FIG. 2 of the '232 patent. Peak attenuations of about −30 dB to about −40 dB were achieved using the present approach, as compared with reductions of −21 dB and −12 dB, respectively, for the prior approach. (These values are absolute values, not the relative values reported in FIG. 2 of the '232 patent, and accordingly differ from those in the '232 patent by a fixed amount of about 3 dB.) FIG. 11 shows the calculated shielding effectiveness for the window prepared according to the invention. The microwave energy is attenuated by −20 dB to −25 dB over the entire measurement range.

EXAMPLE 3

A window having the design configuration shown in FIG. 3 was analyzed. This window has a grid 52 with a surface resistivity of 1000 ohms per square, a first layer 42 of zinc sulfide with a thickness of 0.10 inches, an embedded grid 48 with a surface resistivity of 750 ohms per square, a second layer 40 of zinc selenide with a thickness of 0.25 inches, and a grid 56 with a surface resistivity of 25 ohms per square. This window is transmissive to light ranging from the medium wavelength infrared to the long wavelength infrared. FIG. 14 illustrates the calculated attenuation of reflection as a function of wavelength in the 1–18 GHz wavelength range.

EXAMPLE 4

A window having the design configuration shown in FIG. 7 was analyzed. This window has a first layer 42 of diamond about 0.050 inches thick, a buried grid 80 with a surface resistivity of 1250 ohms per square, a second layer 40 of zinc selenide about 0.3 inches thick, and a grid 82 of surface resistivity 40 ohms per square. FIG. 15 illustrates the calculated attenuation achieved with this grid in the microwave range. This window is transmissive to light ranging from the medium wavelength infrared to the long wavelength infrared

EXAMPLE 5

Figure 16:
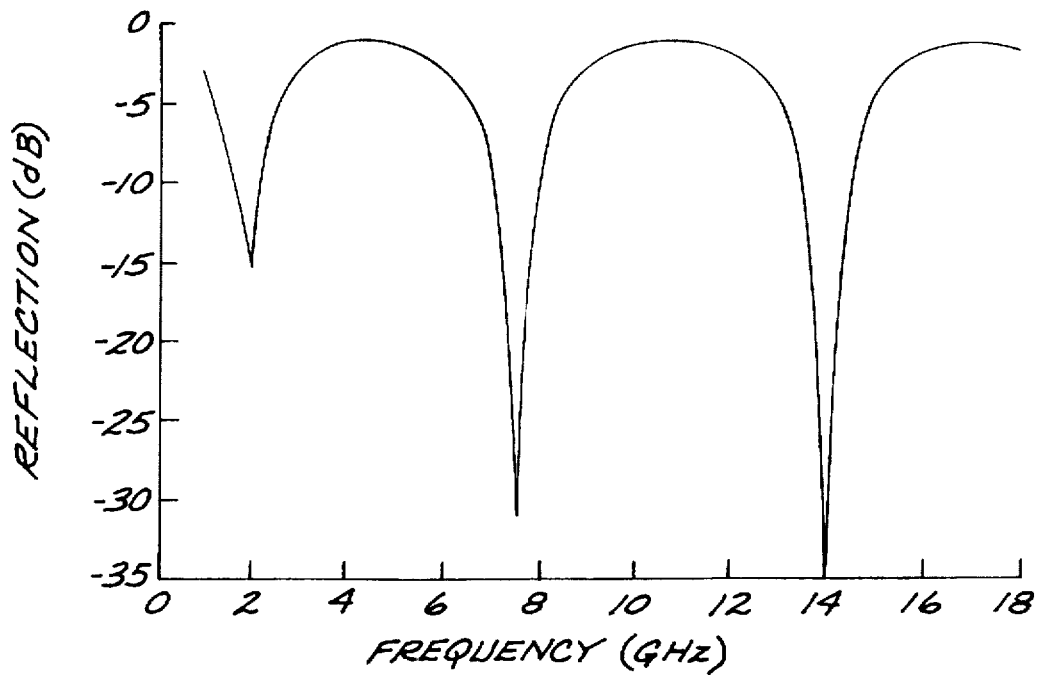
FIG. 16 is a graph of microwave reflection as a function of microwave frequency for a window of the type shown in FIG. 6.

A window having the design configuration shown in FIG. 6 was analyzed. This window has a second grid 52 having a surface resistivity of 1000 ohms per square, a first layer 42 of sapphire of thickness 0.275 inches, a first grid 48 having a surface resistivity of 1000 ohms per square, a 0.25 inch air gap 70, and a second layer 40 of silicon with a thickness of 0.25 inches. This window is transmissive to light in the medium wavelength infrared, about 1.5 to about 5 microns wavelength. FIG. 16, illustrates the calculated reflection attenuation in the microwave range.

EXAMPLE 6

Figure 17:
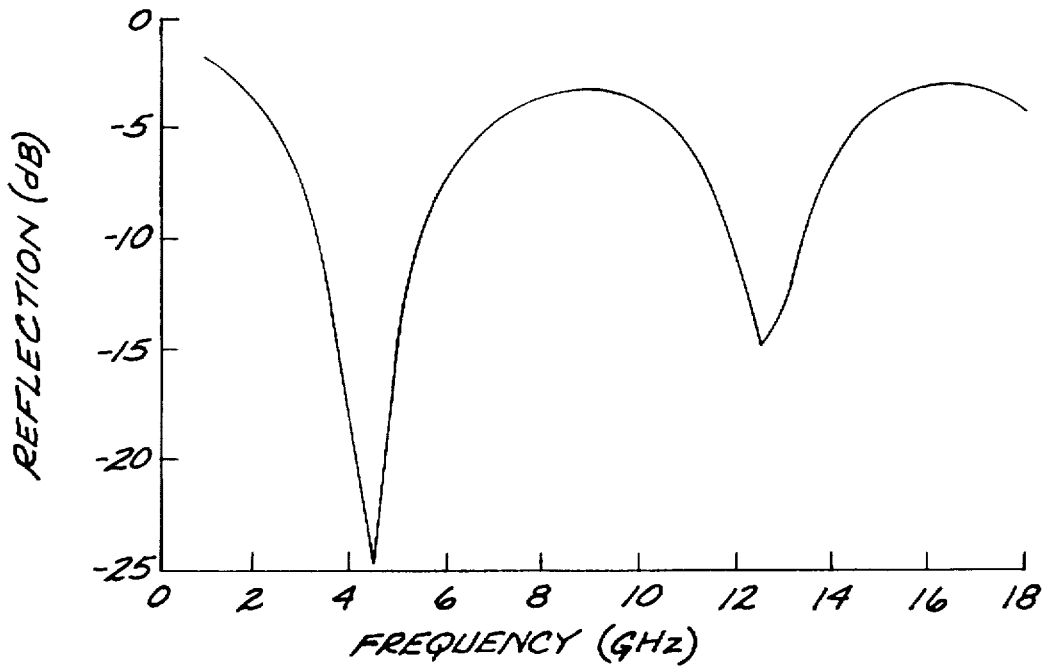
FIG. 17 is a graph of microwave reflection as a function of microwave frequency for a window of the type shown in FIG. 4.
Figure 18:
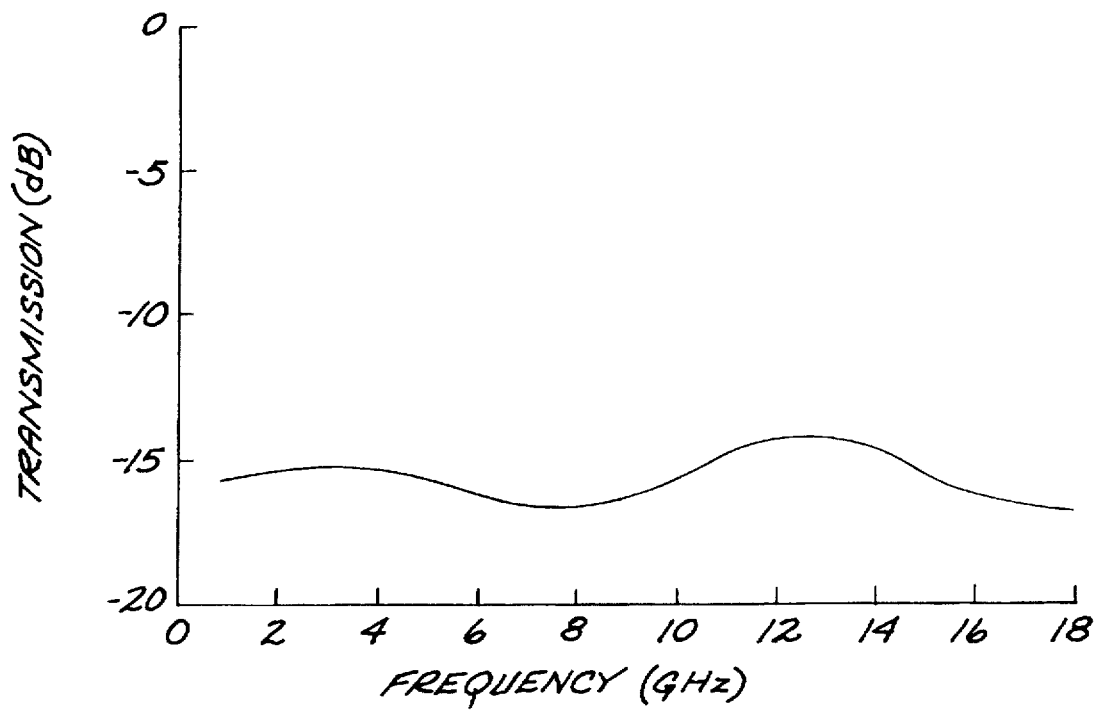
FIG. 18 is a graph of microwave transmission as a function of microwave frequency for a window of the type shown in FIG. 4.

A window having the design configuration shown in FIG. 4 was analyzed. This window has a second conductive layer 62 with a surface resistivity of 1000 ohms per square, a first layer 42 of 0.125 inch thick BK7 glass, a first conductive layer 60 having a surface resistivity of 750 ohms per square, a second layer 40 of 0.25 inch thick BK7 glass, and a third (interior) layer 63 having a surface resistivity of 40 ohms per square. This design is useful for visible light applications for wavelengths ranging from about 0.3 to about 1.5 micrometers. FIG. 17 illustrates the calculated reflectivity as a function of microwave wavelength, and FIG. 18 illustrates the calculated attenuation of the microwave signal as a function of wavelength.

EXAMPLE 7

Figure 20:
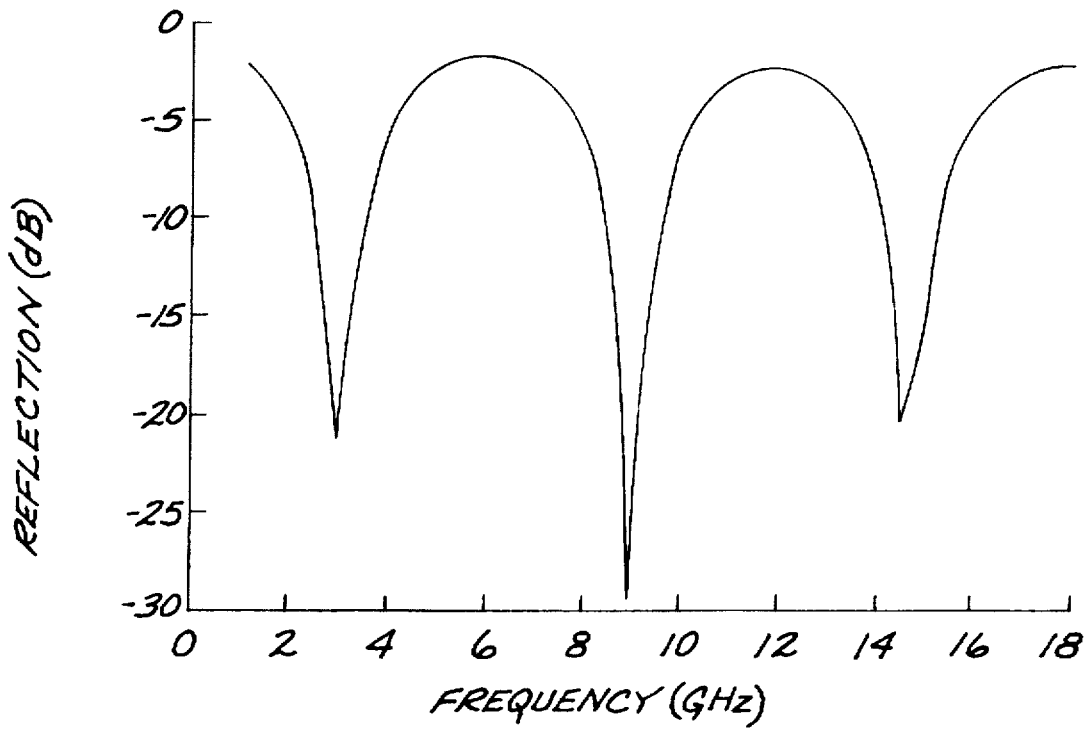
FIG. 20 is a graph of microwave reflection as a function of microwave frequency for a window of the type shown in FIG. 19.

A window having the design configuration shown in FIG. 19 was analyzed. This window has a second grid 52 with a surface resistivity of 750 ohms per square, a first layer 42 of 0.1 inch thick diamond, a second layer 40 of 0.25 inch thick zinc selenide, and a third grid 56 having a surface resistivity of 30 ohms per square. This design is useful for infrared applications. FIG. 20 illustrates the calculated reflectivity as a function of microwave wavelength.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A window, comprising:

a first layer of a first material that transmits radiation in a transmitted wavelength range selected from the group consisting of the visible and the infrared, the first material being a dielectric;

a second layer positioned adjacent to the first layer, the second layer comprising a second material that transmits radiation in the transmitted wavelength range selected for the first material, the second material being selected from the group consisting of a dielectric and a semiconductor;

first electrical conductor means disposed between the first layer and the second layer, for imparting electrical conductivity to a region between the first layer and the second layer wherein the first electrical conductor means comprises a first grid of electrical conductors; and second electrical conductor means disposed on at least one of an exterior surface of the first layer remote from the second layer and an interior surface of the second layer remote from the first layer, for imparting electrical conductivity at the exterior surface, wherein the second electrical conductor means comprises a second grid of electrical conductors.

2. The window of claim 1, wherein the second electrical conductor means comprises a second electrical conductor disposed on the exterior surface.

3. The window of claim 1, wherein the second electrical conductor means comprises a second electrical conductor disposed on the interior surface.

4. The window of claim 1, wherein the second electrical conductor means comprises a second exterior electrical conductor disposed on the exterior surface and a second interior electrical conductor disposed on the interior surface.

5. The window of claim 1, wherein the second material is a dielectric.

6. The window of claim 1, wherein the second material is a semiconductor.

7. The window of claim 1, wherein the second material is a dielectric, and the first material and the second material are the same dielectric material.

8. The window of claim 1, wherein the second material is a dielectric, and the first material and the second material have substantially the same dielectric constant.

9. The window of claim 1, wherein the first layer and the second layer are in intimate physical contact with each other with the first electrical conductor means therebetween.

10. The window of claim 1, wherein the first layer and the second layer are spaced apart with a gap therebetween.

11. The window of claim 1, further including a protective layer overlying the exterior surface.

12. The window of claim 1, further including
an antireflective coating on an exposed surface of at least one of the first layer and the second layer.

13. The window of claim 1, wherein
the first layer and the second layer are in intimate physical contact with each other, wherein
the second material is a dielectric, and wherein
the second electrical conductor means comprises a second exterior electrical conductor disposed on the exterior surface and a second interior electrical conductor disposed on the interior surface.

14. The window of claim 1, wherein
the first layer and the second layer are spaced apart with a gap therebetween, wherein the second material is a dielectric, and wherein the second electrical conductor means comprises a second exterior electrical conductor disposed on the exterior surface and a second interior electrical conductor disposed on the interior surface.

15. The window of claim 1, wherein the first layer and the second layer are in intimate physical contact with each other, wherein the second material is a semiconductor, and wherein the second electrical conductor means comprises a second exterior electrical conductor disposed on the exterior surface.

16. The window of claim 1, wherein the first layer and the second layer are spaced apart with a gap therebetween, wherein the second material is a semiconductor, and wherein the second electrical conductor means comprises a second exterior electrical conductor disposed on the exterior surface.

17. The window of claim 1, further including a third layer positioned adjacent to the second layer, the third layer comprising a second material that transmits radiation in the transmitted wavelength range selected for the first material, and third electrical conductor means disposed between the second layer and the third layer, for imparting electrical conductivity to a region between the second layer and the third layer.

18. The window of claim 1, wherein the first material is selected from the group consisting of zinc sulfide, zinc selenide, diamond, sapphire, spinel, aluminum oxynitride, glass, and yttrium oxide.

19. The window of claim 1, wherein the second material is a dielectric selected from the group consisting of zinc sulfide, zinc selenide, diamond, sapphire, spinel, aluminum oxynitride, yttrium oxide, and glass.

20. The window of claim 1, wherein the second material is a semiconductor selected from the group consisting of germanium, silicon, gallium phosphide, and gallium arsenide.

21. The window of claim 1, wherein the first material and the second material are both transparent to radiation in the visible and in the infrared.

22. A window, comprising:

a first layer of a first material that transmits radiation in a transmitted wavelength range selected from the group consisting of the visible and the infrared, the first material being a dielectric;

a second layer positioned adjacent to the first layer, the second layer comprising a second material that transmits radiation in the transmitted wavelength range selected for the first material, the second material being selected from the group consisting of a dielectric and a semiconductor; and an electrical conductor structure comprising at least two of the following three electrical conductors:

first planar electrical conductor grid having an electrical resistivity of from about 40 to about 1500 ohms per square and located between the first layer and the second layer, a second planar electrical conductor grid having an electrical resistivity of from about 377 to about 1500 ohms per square and located on an exterior surface of the first layer remote from the second layer, and a third planar electrical conductor mid having an electrical resistivity of from about 10 to about 100 ohms per square and located on an interior surface of the second layer remote from the first layer.

23. The window of claim 22, wherein the electrical conductor structure comprises the first planar electrical conductor grid and the second planar electrical conductor grid.

24. The window of claim 22, wherein the electrical conductor structure comprises the first planar electrical conductor grid and the third planar electrical conductor grid.

25. The window of claim 22, wherein the electrical conductor structure comprises the second planar electrical conductor grid and the third planar electrical conductor grid.

26. The window of claim 22, wherein the electrical conductor structure comprises the first planar electrical conductor grid, the second planar electrical conductor grid, and the third planar electrical conductor grid.

27. A window, comprising:

a first layer of a first material that transmits radiation in a transmitted wavelength range selected from the group consisting of the visible and the infrared;

a second layer positioned adjacent to the first layer, the second layer comprising a second material that transmits radiation in the transmitted wavelength range selected for the first material;

electrical conductor means disposed adjacent to and in contact with the first layer and the second layer, for imparting electrical conductivity, the window having an attenuation in reflection for at least three frequency bands in the 1–18 GHz range of at least −15 dB.

28. The window of claim 27, wherein the window has an attenuation in reflection for at least two frequency bands in the 1–18 GHz microwave range of at least −30 dB.

29. A method of protecting optical components, comprising the step of providing a window having a structure comprising a first layer of a first material that transmits radiation in a transmitted wavelength range selected from the group consisting of the visible and the infrared, the first material being a dielectric, a second layer positioned adjacent to the first layer, the second layer comprising a second material that transmits radiation in the transmitted wavelength range selected for the first material, the second material being selected from the group consisting of a dielectric and a semiconductor, first electrical conductor means disposed between the first layer and the second layer, for imparting electrical conductivity to a region between the first layer and the second layer, wherein the first electrical conductor means comprises a first grid of electrical conductors, and second electrical conductor means disposed on at least one of an exterior surface of the first layer remote from the second layer and an interior surface of the second layer remote from the first layer, for imparting electrical conductivity at the exterior surface, wherein the second electrical conductor means comprises a second grid of electrical conductors; and directing radiation of the transmitted wavelength range through the window such that the radiation passes through the first layer before it passes through the second layer.

* * * * *